US012549312B1

(12) United States Patent
Chen et al.

(10) Patent No.: US 12,549,312 B1
(45) Date of Patent: Feb. 10, 2026

(54) SYSTEMS AND METHODS FOR COLLABORATIVE DMRS ALLOCATION FOR UPLINK DATA TRANSMISSION

(71) Applicant: Meta Platforms, Inc., Menlo Park, CA (US)

(72) Inventors: Weizhong Chen, Georgetown, TX (US); Ahmed Gamal Helmy Mohamed, San Jose, CA (US); Colby Scott Boyer, Austin, TX (US)

(73) Assignee: Meta Platforms, Inc., Menlo Park, CA (US)

( * ) Notice: Subject to any disclaimer, the term of this patent is extended or adjusted under 35 U.S.C. 154(b) by 378 days.

(21) Appl. No.: 18/306,963

(22) Filed: Apr. 25, 2023

Related U.S. Application Data

(60) Provisional application No. 63/334,608, filed on Apr. 25, 2022.

(51) Int. Cl.
  *H04L 5/00* (2006.01)
(52) U.S. Cl.
  CPC .......... *H04L 5/0051* (2013.01); *H04L 5/0035* (2013.01); *H04L 5/0037* (2013.01); *H04L 5/0073* (2013.01)
(58) Field of Classification Search
  None
  See application file for complete search history.

(56) References Cited

U.S. PATENT DOCUMENTS

| 9,118,369 B2 | 8/2015 | Sorrentino et al. |
| 9,276,729 B2 | 3/2016 | Clausen et al. |
| 9,425,946 B2 | 8/2016 | Pourahmadi et al. |
| 9,571,242 B2 | 2/2017 | Balraj |
| 9,848,410 B2 | 12/2017 | Ouchi et al. |
| 2015/0373694 A1* | 12/2015 | You .................. H04L 5/0051 370/329 |

(Continued)

OTHER PUBLICATIONS

Karunakaran P., et al., "On Interference Rejection Combining for LTE-A Systems: Analysis of Covariance Estimators and an Iterative Algorithm for Frequency-selective Channels," 2015 IEEE 81st Vehicular Technology Conference (VTC Spring), May 14, 2015, 5 Pages.

*Primary Examiner* — Diane L Lo
(74) *Attorney, Agent, or Firm* — EVERSHEDS SUTHERLAND (US) LLP

(57) ABSTRACT

A disclosed computer-implemented method may include (1) receiving, at a cell in a fifth generation new radio (5G-NR) network, a plurality of uplink signals, each uplink signal corresponding to a different user equipment (UE) device in a group of UE devices, (2) collecting, from a plurality of adjacent cells in the 5G-NR network that are adjacent to the cell, a plurality of demodulation reference signal (DMRS) configurations allocated to the plurality of adjacent cells, (3) determining, by analyzing the plurality of DMRS configurations allocated to the adjacent cells in accordance with an allocation rule for creating DMRS configurations of adjacent cells for a common frequency sub-band without overlapping coded resources, a set of available DMRS configuration candidates, and (4) select a DMRS configuration candidate from the set of available DMRS configuration candidates for the group of UE devices. Various other systems and methods are also disclosed.

18 Claims, 10 Drawing Sheets

(56) References Cited

U.S. PATENT DOCUMENTS

| | | | |
|---|---|---|---|
| 2016/0021565 A1* | 1/2016 | Kim | H04J 11/004 370/329 |
| 2018/0278395 A1* | 9/2018 | Yoon | H04L 5/0051 |
| 2019/0288816 A1* | 9/2019 | Ren | H04L 5/0094 |

* cited by examiner

SYSTEMS AND METHODS FOR COLLABORATIVE DMRS ALLOCATION FOR UPLINK DATA TRANSMISSION

CROSS-REFERENCE TO RELATED APPLICATION

This application claims the benefit of U.S. Provisional Patent Application No. 63/334,608, filed Apr. 25, 2022, the disclosure of which is incorporated, in its entirety, by this reference.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
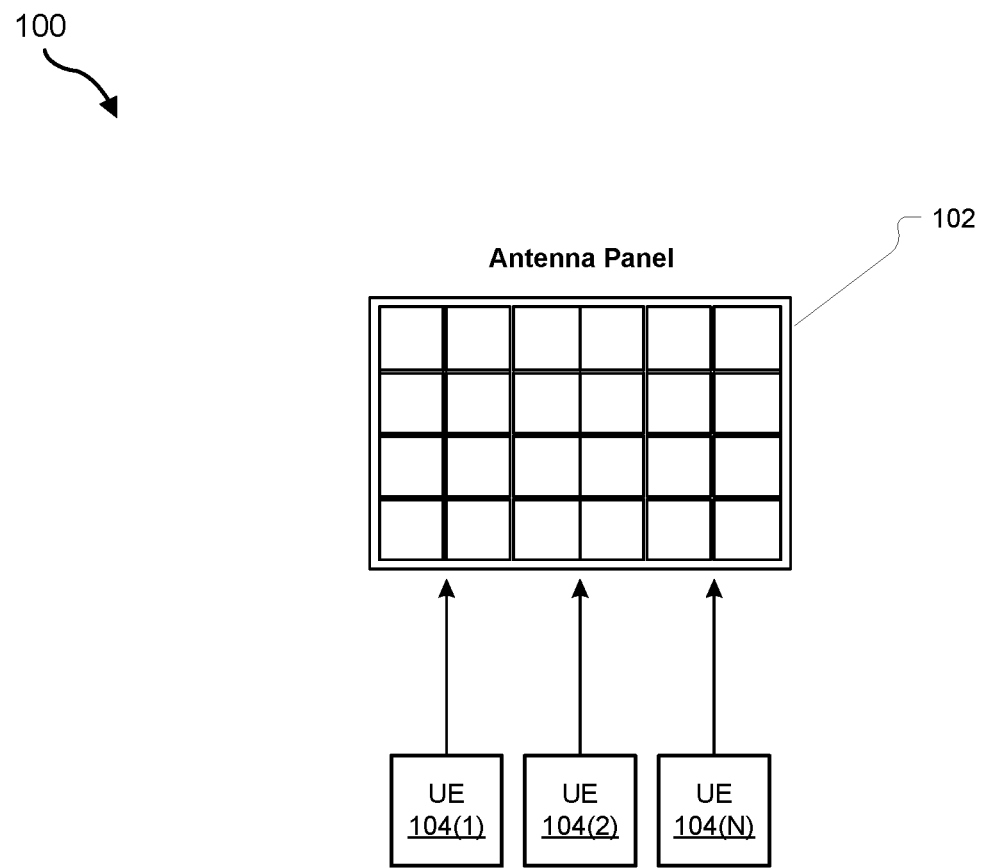
FIG. 1 shows a block diagram of a Multiple-Input, Multiple-Output (MIMO) system that includes an antenna panel that may receive radiations from one or more user equipment devices (UEs).

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

New Radio (NR) is a radio access technology (RAT) developed by the 3rd Generation Partnership Project (3GPP) for the fifth generation (5G) mobile network. In 5G-NR, a physical uplink shared channel (PUSCH) is a physical uplink channel that carries user data from a UE device to a base station (BS). A demodulation reference signal (DMRS) is a reference signal associated with PUSCH. DMRS is used for channel estimation as part of coherent demodulation of PUSCH. The DMRS, known to both the BS and the UE, is sent by the UE, and is used by the BS receiver to acquire a propagation channel to recover data from each UE.

The time-frequency structure of DMRS depends on the type of waveform configured for PUSCH, as defined in 3rd Generation Partnership Project; Technical Specification Group Radio Access Network (TS) 38.211 "NR; Physical channels and modulation," §§ 6.4.1.1 and 6.4.1.2. The basic transmission scheme in NR is orthogonal frequency-division multiplexing (OFDM). NR supports a flexible OFDM numerology with subcarrier spacings ranging from 15 kHz up to 240 kHz with a proportional change in cyclic prefix (CP) duration.

In general, an uplink (UL) RB is the smallest resource allocation unit, which is 12 resource elements (RE) in the frequency domain and up to 14 symbols per slot. The frequency separation between REs may be referred to as sub-carrier spacing (SCS). As mentioned above, SCS may be $15 \times 2^\mu$ KHz, such that $\mu=0,1,2,3,4$, resulting in SCS values of 15 KHz, 30 KHz, 60 KHz, 120 KHz, and 240 KHz, respectively. A symbol duration $T_S$ may be related to SCS by $$T_s = \frac{1}{scs}.$$

Each symbol has a cyclic prefix (CP) with a duration related to SCS SCS or μ.

5G-NR DMRS signals are partitioned into code division multiplexing (CDM) groups. Each CDM group may belong to a set of antenna ports or layers of data to be transmitted. Within CDM groups, ports are coded with an orthogonal cover code (OCC). Different CDM groups may be physically separated in frequency or frequency and time. CDM groups physically separated in frequency may be referred to as having a DMRS length of 1 (DMRSLength=1) and CDM groups physically separated in frequency and time may be referred to having a DMRS length of 2 (DMRSLength=2). DMRS signals of adjacent cell interferers may also be transmitted in CDM groups. Signals received on DMRS resources of one CDM group can only be used to effectively observe interference's spatial feature in that CDM group.

DMRS has different configurations: configuration type 1 includes 2 CDM groups for OCC, with a frequency density of 3 DMRS anchors per RB per port, whereas configuration type 2 includes 3 CDM groups for OCC, with a frequency density of 2 DMRS anchors per RB per port. NR UL supports symbol sharing data and DMRS; configuration type 2 has lower DMRS cost if fewer ports are actually used. REs on unused CDM groups may be used for data, while unused ports within a used CDM may not be used for data. For example, in type 1 single symbol, a maximum of 4 ports are supported. If only port 2/3 is used, the DMRS position for port 0/1 can be used for data. Furthermore, discrete Fourier transform (DFT) spread coded OFDM (DFT-s-OFDM) (e.g., for data) is only defined for DMRS configuration type 1.

PUSCH may generally support two main time-domain structures, referred to as mapping type A and mapping type B. In PUSCH mapping type A, the PUSCH can start with first symbol of the slot, and the first DMRS can be located in symbol 2 or 3 of the slot, regardless of the length of PUSCH. Mapping type A may have a PUSCH length (also "PUSCHLength" herein) of 4~14 symbols. In PUSCH mapping type B, the PUSCH may start from a 0th to a 12th symbol of the slot, and the first symbol of the PUSCH allocation is a DMRS. Mapping type B may have a PUSCHLength of 2~14 symbols. To support high-speed scenarios, it is possible to configure up to three additional DMRS occasions in a slot. This may be denoted as a DMRS Additional Position value or DMRSAdditionalPosition herein (e.g., DMRSAdditionalPosition=0,1,2,3).

In summary, parameters to specify a DMRS configuration may include DMRSConfigType=1,2; DMRSLength=1,2; PUSCHMappingType=A,B; PUSCHLength=4~14 or 2~14; and DMRSAdditionalPosition=0,1,2,3. Likewise, a DMRS configuration for an uplink PUSCH can be specified by StartSymboolID of DMRSpositions: 4 bits for position 1,2,3,4 and/or DMRSConfigType and DMRSLength: 2 bits. As described above, DMRS of a cell may be used for channel estimation and/or spatial feature measurement for adjacent cell interference.

It may be that the existing 5G-NR specification may not describe or specify how to collaboratively allocate the DMRS structure for uplink data transmission for a set of adjacent cells. Hence, this disclosure is generally directed to a collaborative DMRS allocation approach for uplink data transmission. As described in greater detail below, this disclosure is generally directed to collaborative uplink DMRS allocation among adjacent cells for uplink data transmission. This collaborative DMRS allocation may significantly increase adjacent cell interference rejection capabilities for these serving cells, thus increasing the link performance for the cells individually and collectively for uplink data transmission. This disclosure may also describe novel systems and methods for maximizing adjacent cell interference rejection.

The present application is directed to systems and methods for collaborative DMRS allocation for uplink data transmission. As will be described in greater detail below, embodiments of one or more of the systems described herein may receive, at a cell in a fifth-generation new radio (5G-NR) network, a plurality of uplink signals, each uplink signal corresponding to a different user equipment (UE) device in a group of UE devices. Embodiments may further collect, from a plurality of adjacent cells in the 5G-NR network that are adjacent to the cell, a plurality of demodulation reference signal (DMRS) configurations allocated to the plurality of adjacent cells. Embodiments may further determine, by analyzing the plurality of DMRS configurations allocated to the plurality of adjacent cells in accordance with an allocation rule for creating DMRS configurations of adjacent cells for a common frequency sub-band without overlapping coded resources, a set of available DMRS configuration candidates. Embodiments may also select, based on a predetermined prioritization of DMRS parameters for a DMRS configuration, a DMRS configuration candidate from the set of available DMRS configuration candidates for the group of UE devices.

In some examples, one or more embodiments may further use the DMRS configuration candidate to measure a noise and interference of adjacent cells included in a received signal based on the selected DMRS configuration candidate and may generate a covariance matrix of the measured noise and interference of adjacent cells. Further embodiments may also perform a MIMO equalization using the received uplink signal and the covariance matrix.

The following will provide, with reference to FIGS. 1-4 and 6-10, detailed descriptions of systems for collaborative DMRS allocation for uplink data transmission. Detailed descriptions of corresponding computer-implemented methods will also be provided in connection with FIG. 5.

In general, massive MIMO systems use one or more antenna panels to receive radiations from multiple UEs, each sending a signal over the same radio resources. Data from a UE can be sent with one or more antenna ports. Each UE is allocated one or more unique antenna ports by a BS. FIG. 1 shows a block diagram of a MIMO system 100 that includes an antenna panel 102 that may receive radiations from one or more UE 104 (e.g., UE 104(1), UE 104(2), UE 104(N)). Note that although FIG. 1 shows three UEs, this is provided by way of example only and a MIMO system 100 may include any suitable number of UE devices.

Figure 2:
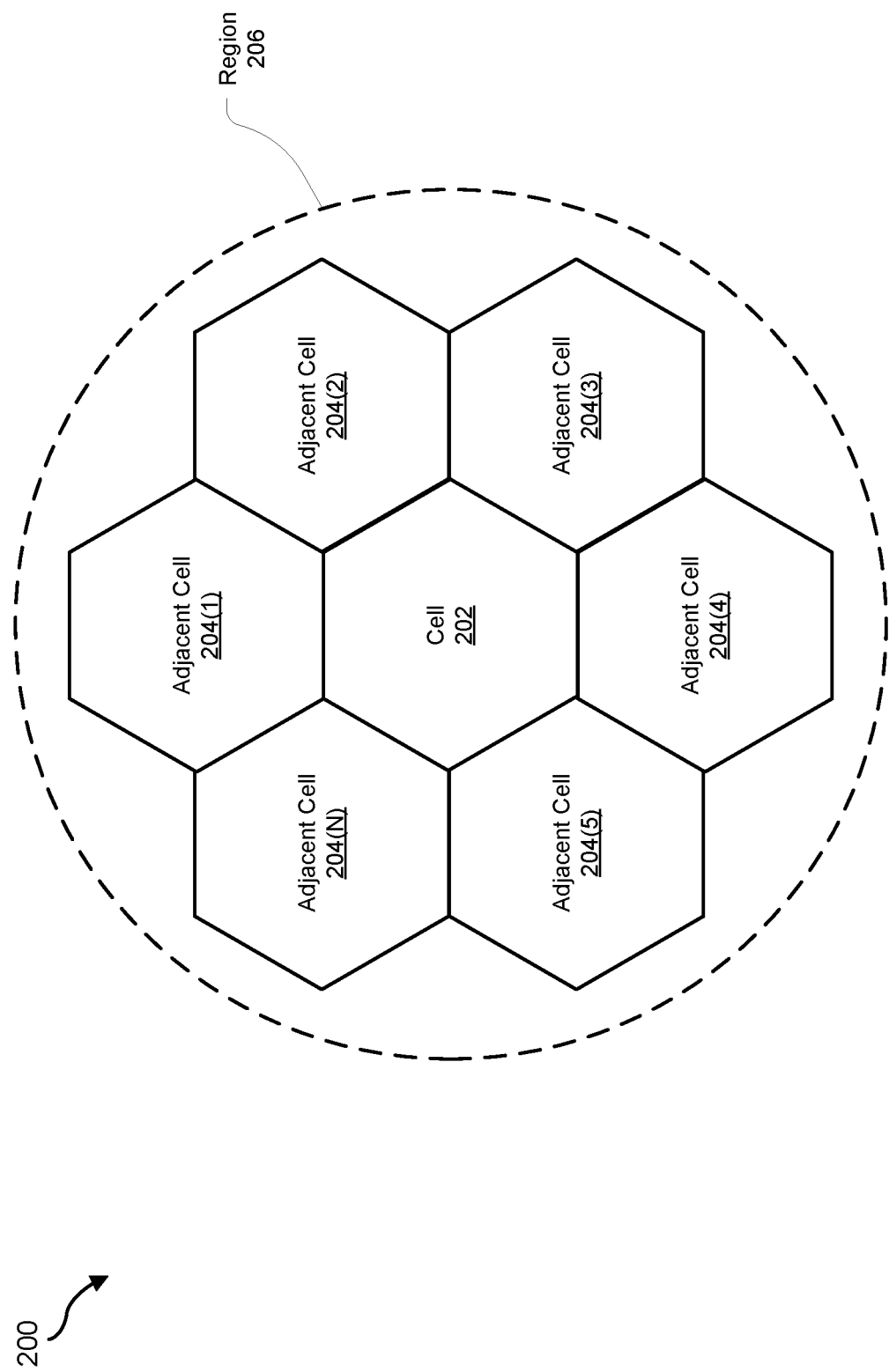
FIG. 2 shows diagram of a cell and a set of adjoining cells in a fifth-generation new radio (5G-NR) network.

FIG. 2 shows a diagram 200 of a cell 202 and a plurality of adjacent cells 204 (e.g., adjacent cell 204(1) through adjacent cell 204(N)) that may each be adjacent to cell 202. Note that, although six adjacent cells are shown in FIG. 2, this is for illustrative purposes only, and adjacent cells 204 may include any suitable number of cells. Cell 202 and adjacent cells 204 may cover a geographic region 206. In some examples, as described above, cell 202 and adjacent cells 204 may interfere with each other. Hence, embodiments of the systems and methods described herein may significantly increase adjacent cell interference rejection capabilities for these serving cells, thus increasing the link performance for the cells individually and collectively for uplink data transmission. This disclosure may also describe novel systems and methods for maximizing adjacent cell interference rejection.

Figure 3:
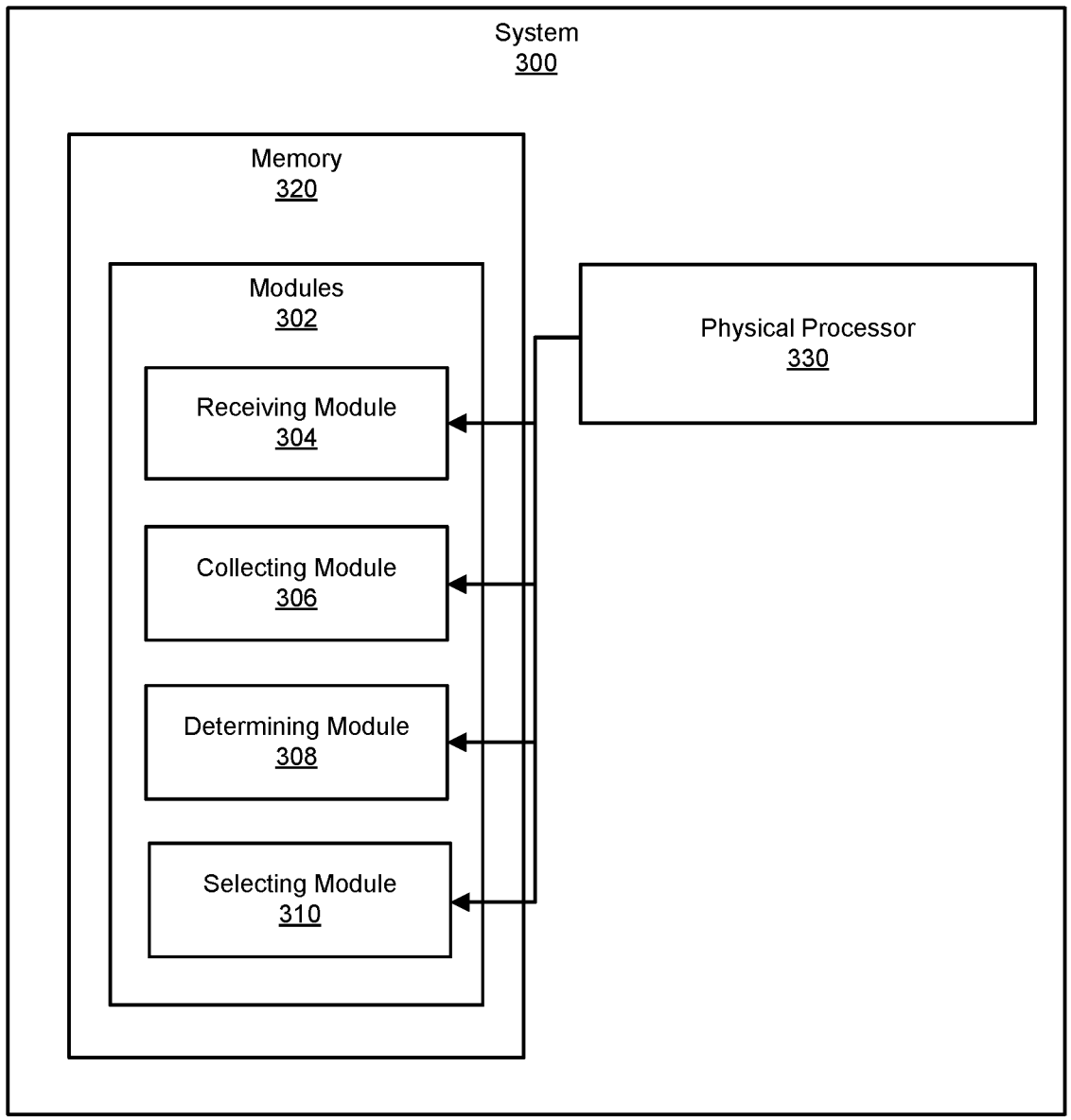
FIG. 3 is a block diagram of an example system for collaborative DMRS allocation for uplink data transmission.

FIG. 3 is a block diagram of an example system 300 for collaborative DMRS allocation for uplink data transmission. As illustrated in this figure, example system 300 may include one or more modules 302 for performing one or more tasks. As will be explained in greater detail below, modules 302 may include a receiving module 304 that receives, at a cell in a 5G-NR network, a plurality of uplink signals, each uplink signal corresponding to a different UE device in a group of UE devices. Example system 300 may also include a collecting module 306 that collects, from a plurality of adjacent cells in the 5G-NR network that are adjacent to the cell, a plurality of DMRS configurations allocated to the plurality of adjacent cells.

As further illustrated in FIG. 3, example system 300 may also include a determining module 308 that determines, by analyzing the plurality of DMRS configurations allocated to the plurality of adjacent cells in accordance with an allocation rule for creating DMRS configurations of adjacent cells for a common frequency sub-band without overlapping coded resources, a set of available DMRS configuration candidates. Example system 300 may also include a selecting module 310 that selects, based on a predetermined prioritization of DMRS parameters for a DMRS configuration, a DMRS configuration candidate from the set of available DMRS configuration candidates for the group of UE devices.

As also illustrated in FIG. 3, example system 300 may also include one or more memory devices, such as memory 320. Memory 320 generally represents any type or form of volatile or non-volatile storage device or medium capable of storing data and/or computer-readable instructions. In one example, memory 320 may store, load, and/or maintain one or more of modules 302. Examples of memory 320 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further illustrated in FIG. 3, example system 300 may also include one or more physical processors, such as physical processor 330. Physical processor 330 generally represents any type or form of hardware-implemented processing unit capable of interpreting and/or executing computer-readable instructions. In one example, physical processor 330 may access and/or modify one or more of modules 302 stored in memory 320. Additionally or alternatively, physical processor 330 may execute one or more of modules 302 to facilitate collaborative DMRS allocation for uplink data transmission. Examples of physical processor 330 include, without limitation, microprocessors, microcontrollers, central processing units (CPUs), Field-Programmable Gate Arrays (FPGAs) that implement softcore processors, Application-Specific Integrated Circuits (ASICs), digital signal processors (DSPs), portions of one or more of the same, variations or combinations of one or more of the same, or any other suitable physical processor.

Figure 4:
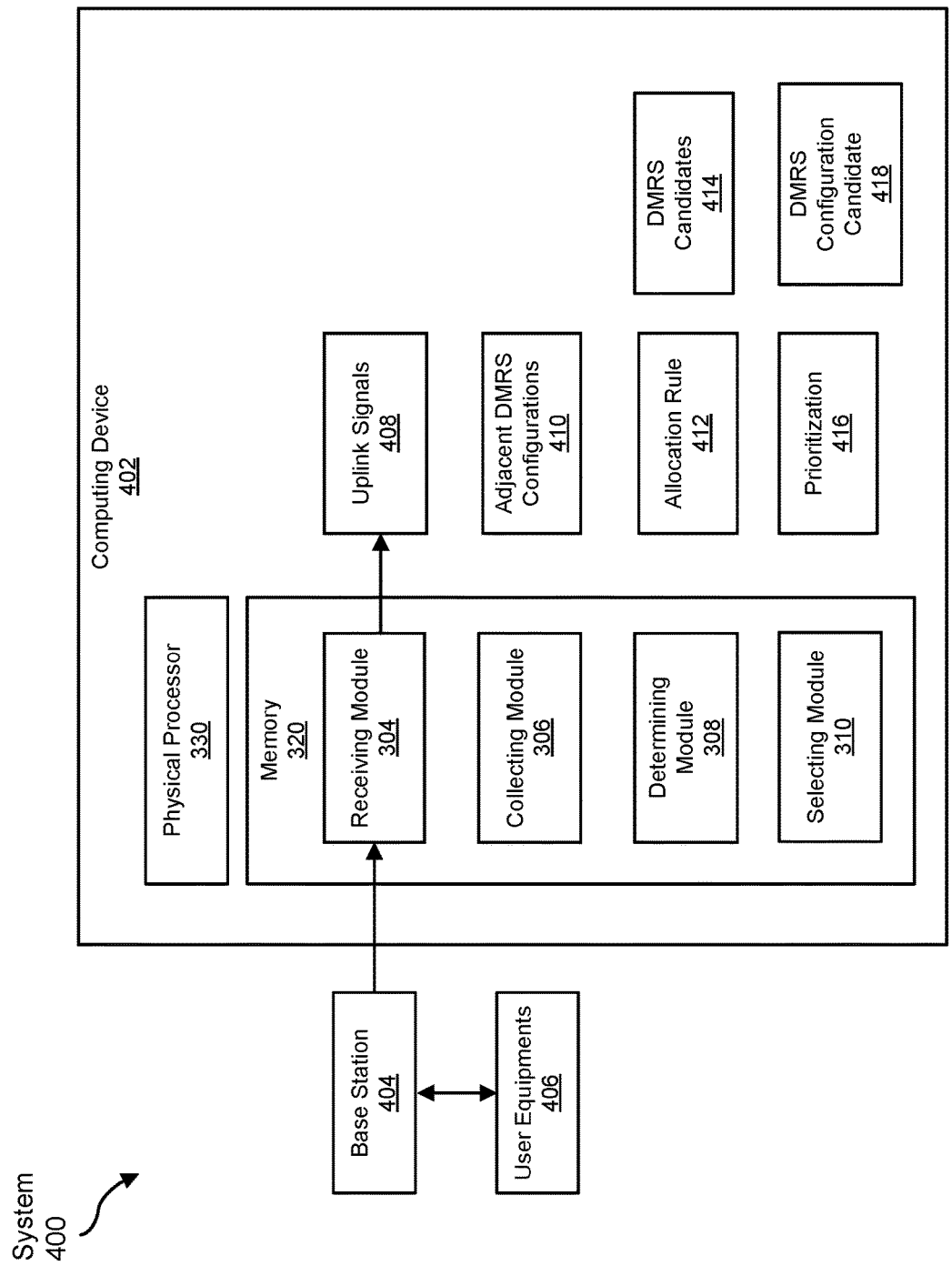
FIG. 4 is a block diagram of an example implementation of a system for collaborative DMRS allocation for uplink data transmission.

Example system 300 in FIG. 3 may be implemented in a variety of ways. For example, all or a portion of example system 300 may represent portions of an example system 400 ("system 400") in FIG. 4. As shown in FIG. 4, system 400 may include computing device 402 in communication with a base station 404. Base station 404 may further be in communication with a plurality of user equipments 406. In at least one example, computing device 402 may be programmed with one or more of modules 302.

In at least one embodiment, one or more of modules 302 from FIG. 3 may, when executed by computing device 402, enable computing device 402 to perform one or more operations for collaborative DMRS allocation for uplink data transmission. For example, as will be described in greater detail below, receiving module 304 may cause computing device 402 to receive, at a cell in a 5G-NR network (e.g., cell 202), a plurality of uplink signals (e.g., uplink signals 408), each uplink signal corresponding to a different UE device in a group of UE devices (e.g., one UE 104 included in UEs 104).

Additionally, collecting module 306 may cause computing device 402 to collect, from a plurality of adjacent cells in the 5G-NR network (e.g., adjacent cells 204) that are adjacent to the cell, a plurality of DMRS configurations allocated to the plurality of adjacent cells (e.g., adjacent DMRS configurations 410). Additionally, determining module 308 may cause computing device 402 to determine, by analyzing the plurality of DMRS configurations allocated to the plurality of adjacent cells in accordance with an allocation rule for creating DMRS configurations of adjacent cells for a common frequency sub-band without overlapping coded resources (e.g., allocation rule 412), a set of available DMRS configuration candidates (e.g., DMRS candidates 414).

Furthermore, selecting module 310 may select, based on a predetermined prioritization of DMRS parameters for a DMRS configuration (e.g., prioritization 416), a DMRS configuration candidate (e.g., DMRS configuration candidate 418) from the set of available DMRS configuration candidates for the group of UE devices.

Computing device 402 generally represents any type or form of computing device capable of reading and/or executing computer-executable instructions and/or hosting executables. Examples of computing device 402 include, without limitation, application servers, storage servers, database servers, web servers, signal processing devices, and/or any other suitable computing device configured to run certain software applications and/or provide various application, storage, and/or signal processing services.

In at least one example, computing device 402 may be a computing device programmed with one or more of modules 302. All or a portion of the functionality of modules 302 may be performed by computing device 402 and/or any other suitable computing system. As will be described in greater detail below, one or more of modules 302 from FIG. 3 may, when executed by at least one processor of computing device 402, enable computing device 402 to improve channel estimation by reducing edge effects for one or more signals used for a DMRS channel estimation process.

Base station 404 may generally represent an element within a wireless communication system (e.g., system 400) that provides radio coverage and connectivity to user equipment (e.g., user equipments 406) within a specific area or cell. A 5G base station may also be referred to as a gNodeB (gNB). Base station 404 may include a variety of components including, without limitation, an antenna array, a transceiver unit, and one or more baseband processing units. The antenna array may be used to transmit and receive radio signals, while the transceiver unit may be responsible for processing the signals and converting them to digital data that can be sent to the baseband processing units. The baseband processing units may be responsible for performing signal processing, error correction, and modulation and demodulation of the signals. Although not so illustrated in FIG. 4, in some examples, computing device 402 may be included as part of base station 404 and/or may be in communication with one or more components of base station 404.

User equipments 406 may include a plurality of mobile devices. Each mobile device or endpoint may connect to a 5G network to access various services, such as voice, video, and data communication. user equipment 406 can be a smartphone, tablet, laptop, or any other wireless device that is designed to operate with 5G networks. In some examples, each of user equipments 406 may include a 5G modem, one or more antennas, and/or any other suitable hardware that may facilitate communication with base station 404.

Many other devices or subsystems may be connected to system 300 in FIG. 3 and/or system 400 in FIG. 4. Conversely, all of the components and devices illustrated in FIGS. 3 and 4 need not be present to practice the embodiments described and/or illustrated herein. The devices and subsystems referenced above may also be interconnected in different ways from those shown in FIG. 4. Systems 300 and 400 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 5:
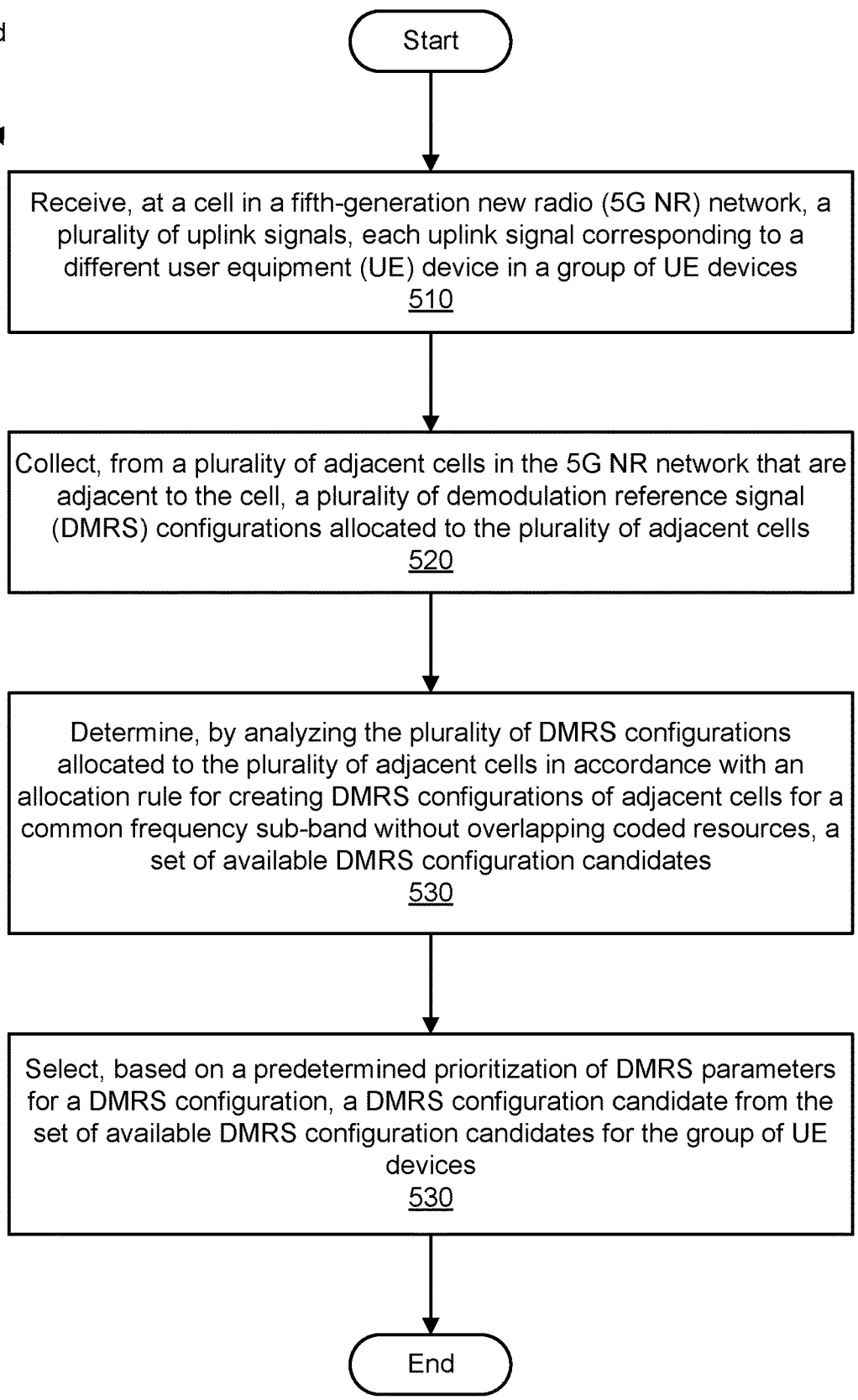
FIG. 5 is a flow diagram of an example method for collaborative DMRS allocation for uplink data transmission.

FIG. 5 is a flow diagram of an example computer-implemented method 500 for collaborative DMRS allocation for uplink data transmission. The steps shown in FIG. 5 may be performed by any suitable computer-executable code and/or computing system, including system 300 in FIG. 3, system 400 in FIG. 4, and/or variations or combinations of one or more of the same. In one example, each of the steps shown in FIG. 5 may represent an algorithm whose structure includes and/or is represented by multiple substeps, examples of which will be provided in greater detail below.

As illustrated in FIG. 5, at step 510, one or more of the systems described herein may receive, at a cell in a 5G-NR network, a plurality of uplink signals, each uplink signal corresponding to a different UE device in a group of UE devices. For example, receiving module 304 may, as part of computing device 402, cause computing device 402 to receive uplink signals 408.

Receiving module 304 may cause computing device 402 to receive uplink signals 408 in a variety of contexts. For example, user equipments 406 may each seek to establish an uplink with base station 404. Each of user equipments 406 may send an uplink signal to base station 404. Base station 404 may communicate and/or transmit the uplink signals to computing device 402 via receiving module 304. Hence, receiving module 304 may cause computing device 402 to receive uplink signals 408 from user equipments 406 via base station 404.

Returning to FIG. 5, at step 520, one or more of the systems described herein may collect, from a plurality of adjacent cells in the 5G-NR network that are adjacent to the cell, a plurality of DMRS configurations allocated to the plurality of adjacent cells. For example, collecting module 306 may, as part of computing device 402, collect, from adjacent cells 204, adjacent DMRS configurations 410. By way of illustration, collecting module 306 may request, and may receive, from each of adjacent cells 204, a DMRS configuration allocated to that adjacent cell.

Returning to FIG. 5, at step 530, one or more of the systems described herein may determine, by analyzing the plurality of DMRS configurations allocated to the plurality of adjacent cells in accordance with an allocation rule for creating DMRS configurations of adjacent cells for a common frequency sub-band without overlapping coded resources, a set of available DMRS configuration candidates. For example, determining module 308 may determine, by analyzing adjacent DMRS configurations 410 in accordance with allocation rule 412, DMRS candidates 414. Moreover, at step 540, one or more of the systems described herein may select, based on a predetermined prioritization of DMRS parameters for a DMRS configuration, a DMRS configuration candidate from the set of available DMRS configuration candidates for the group of UE devices. For example, selecting module 310 may select, based on prioritization 416, DMRS configuration candidate 418.

Figure 6:
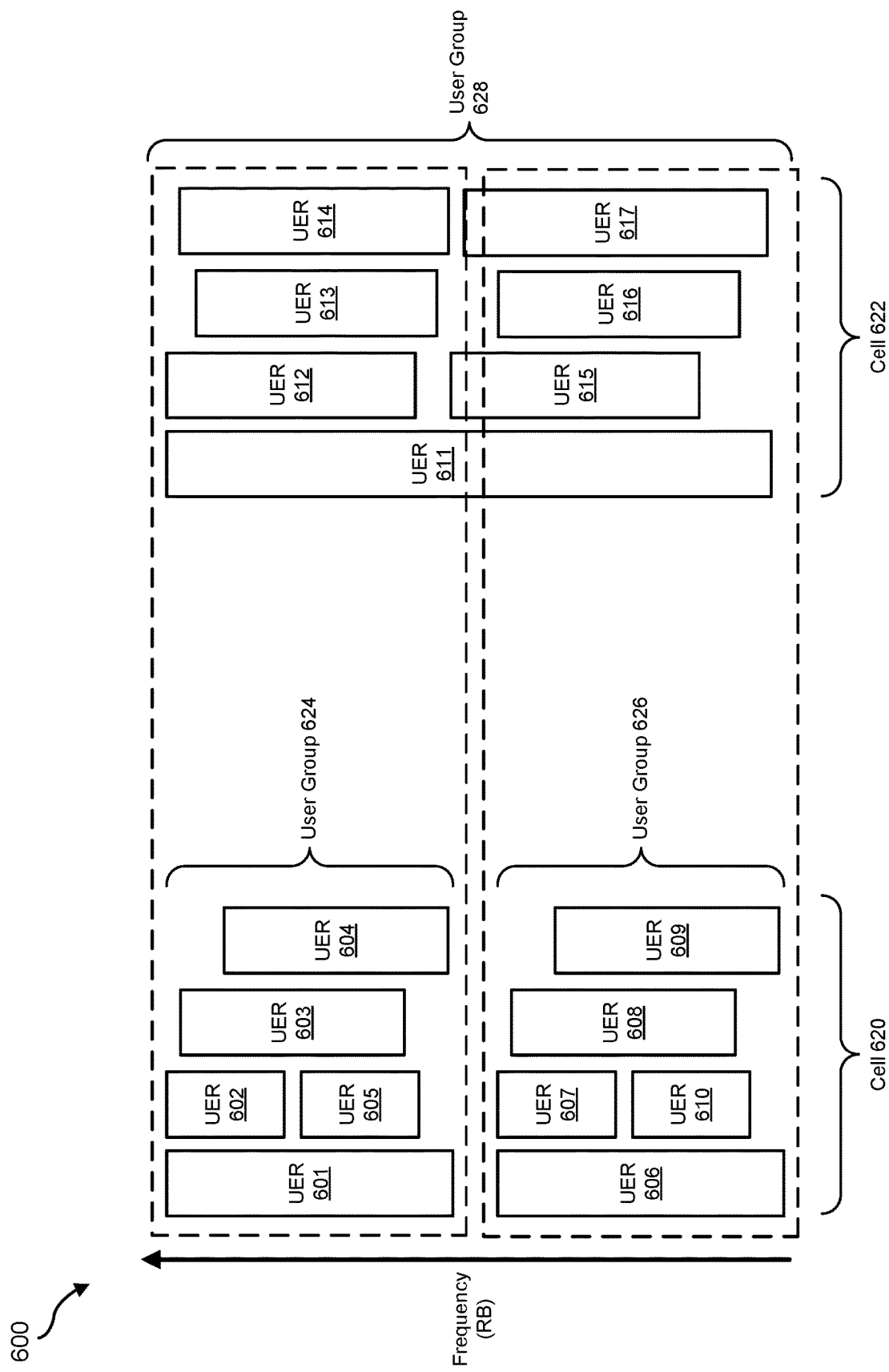
FIG. 6 is a block diagram that illustrates an example allocation rule for creating DMRS configurations of adjacent cells.

FIG. 6 includes a block diagram 600 that illustrates an example allocation rule for creating DMRS configurations of adjacent cells. FIG. 6 includes a plurality of user equipment resources (UER) (e.g., UER 601 through UER 617) allocated to different UE devices. The UERs are included in two cells (e.g., cell 620 and cell 622) and organized in three user groups (e.g., user group 624, user group 626, and user group 628).

As a first rule, assuming a group of neighboring cells (e.g., cell 620 and cell 622) may be interfering with each other, at a given sub-band in which each cell has a group of users sharing the sub-band, a DMRS configuration of these cells may or should be allocated to avoid OCC-coded resources completely overlapping. For a given cell, the DMRS allocation in different sub-bands can be independent of each other, yet the DMRS configuration across adjacent cells should follow the first rule. The uplink receiver of each cell should be capable of measuring adjacent cell interference covariance. The uplink receiver of each cell should further be equipped with interference rejection capabilities in an associated MIMO detection equalizer.

As shown in FIG. 6, if a group of users in a first cell (e.g., cell 620) sharing a sub-band have their DMRS configurations (including DMRSConfigType and DMRSLength) labeled as "DMRS Configuration A" identical to and completely overlapping in DMRS positions with the DMRS configuration labeled as "DMRS Configuration C" of a second cell (e.g., cell 622), cell 620 and cell 622 may be blind to each other in the sub-band in terms of the spatial features of the received signals. Thus, cell 620 may be unable to suppress the interference from cell 622 and vice versa.

If the bandwidth of Cell 622 is larger than the bandwidth of Cell 620, then a DMRS of Cell 622 can be considered to have a partial overlapping with the DMRS of Cell 620. In this case, Cell 622 and Cell 620 may be blind to each other in the overlapping band. FIG. 6 may illustrate and/or explain a relationship between a DMRS Configuration A, a DMRS Configuration B, and a DMRS configuration C, where user group 624 may have a DMRS Configuration A, user group 626 may have a DMRS Configuration B, and user group 628 may have a DMRS Configuration C. To be observable to each other, and therefore to potentially reject each other, DMRSConfig A and DMRSConfig C should not be both identical and completely overlapping. However, they may be (1) identical, but not completely overlapping, or (2) completely overlapping, but not identical. This may be the same for DMRSConfig B and DMRSConfig C. However, DMRSConfig A and DMRSConfig B can be identical since they are for same cell (Cell 620) and yet in different bands. This is a basic requirement for any two cells that may potentially interfere with each other.

DMRS allocation is a dynamic process. Assuming that N adjacent cells potentially interfere with each other, and that the current DMRS allocation for the N cells meets the requirements shown in and described above in relation to FIG. 6, a new DMRS allocation may be made when one sub-band is retired for any reason and a new DMRS configuration is to be allocated for a sub-band that could be larger or smaller than the retired sub-band.

As a starting assumption, one or more of modules 302 may assume a new group of users that can fit into a sub-band are selected and waiting for DMRS configuration. One or more of modules 302 (e.g., collecting module 306) may collect the DMRS configurations already allocated in the other N−1 cells in accordance with:

Cell$_k$(StartSymbolID of DMRSPositions, DMRSConfig), k=1,2, . . . , N as described above.

In some embodiments, one or more of modules 302 (e.g., determining module 308) may collect a set of available configuration candidates by analyzing the DMRS configuration already allocated to the set. As mentioned above, there are N×4 DMRS configurations, which may be sufficient for adjacent channel interference rejection.

Next, one or more of modules 302 (e.g., selecting module 310) may select one of the DMRS configurations for the group from the set of configuration candidates by following a priority order of:

PUSCH Mapping Type→DMRSAdditionalPosition→DMRSConfigType→DMRSLength

FIG. 7 through FIG. 10 may disclose, describe, and/or illustrate a system and/or method for noise and interference observation that may be incorporated as part of the systems and methods for collaborative DMRS allocation for uplink data transmission disclosed herein.

Figure 7:
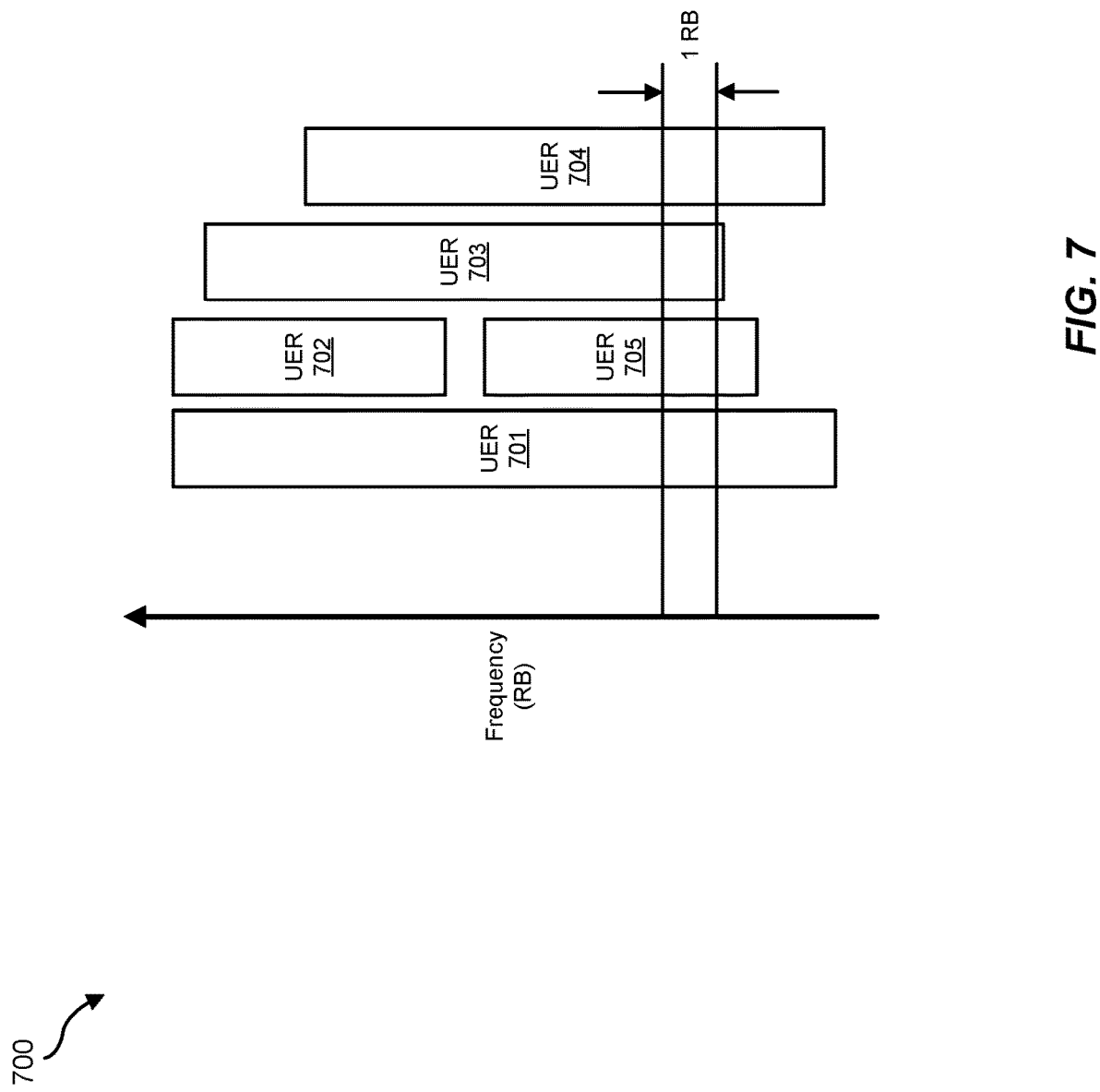
FIGS. 7 through 9 include block diagrams that illustrate measuring a noise and interference of adjacent cells.
Figure 8:
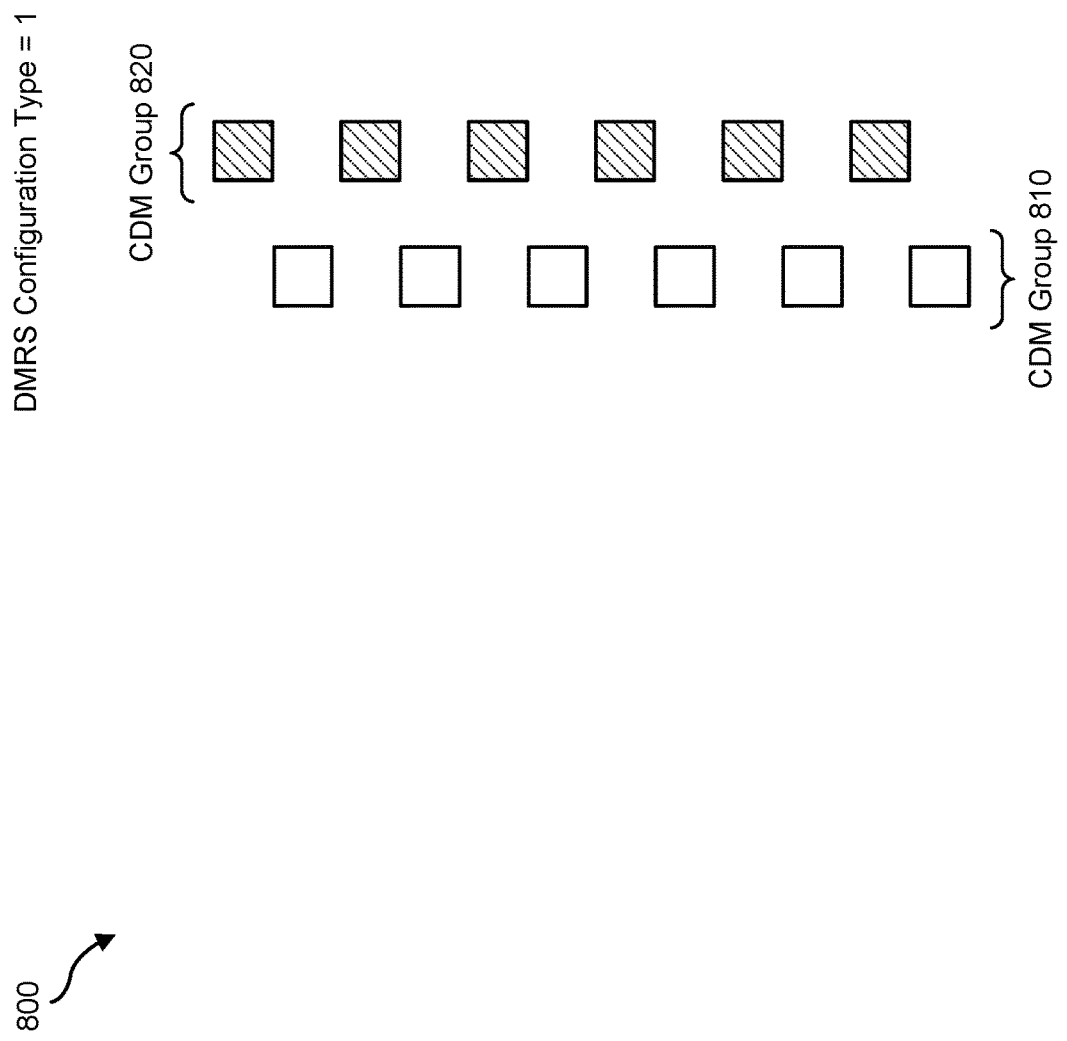
Figure 9:
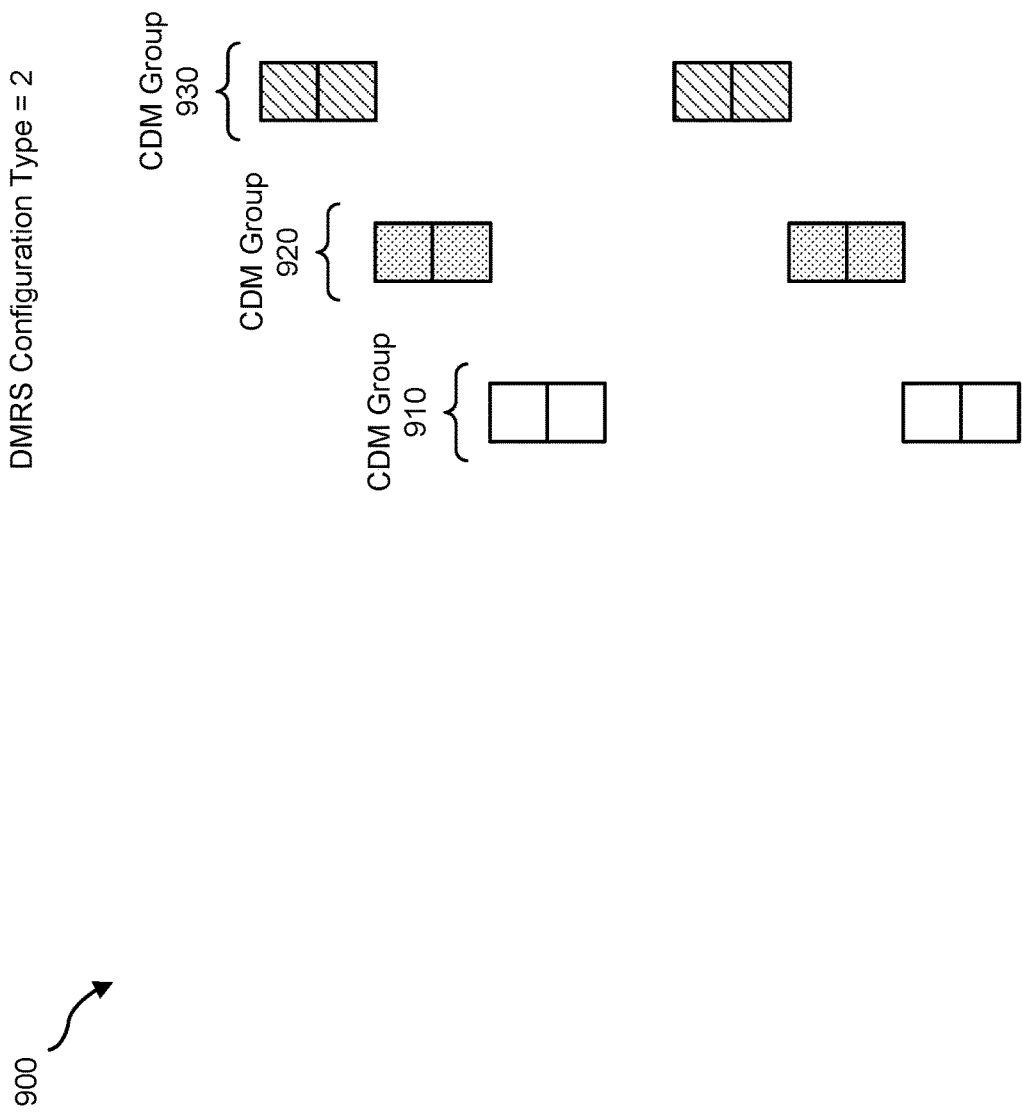

FIG. 7 through FIG. 9 include block diagrams that illustrate measuring a noise and interference of adjacent cells. FIG. 7 includes a block diagram 700 that includes a user group that includes a plurality of UERs (e.g., UER 701 through UER 705). FIG. 7 may illustrate that a noise and interference observation may be made on a per-RB basis, or at least RBs within a sub-band. With that RB, an embodiment may measure the noise and interference on each antenna, which may result in a vector of noise and interference of M elements, with M representing a number of antennas in regular MIMO or M beams in a massive MIMO (mMIMO).

FIG. 8 includes a diagram 800 that shows DMRS resource allocation across frequency for an RB with DMRS Configuration Type=1 having a CDM group 810 and a CDM group 820, and FIG. 9 includes a diagram 900 that shows DMRS resource allocation across frequency for an RB with DMRS Configuration Type=2 having a CDM group 910, a CDM group 920, and a CDM group 930. For the RB to be observed, one or more of modules 302 (e.g., receiving module 302) may observe noise and interference on a per-CDM group basis.

The following may further describe, illustrate, and/or disclose systems and methods for noise and interference covariance measurement within an RB. At a RE (l) in an RB of a DMRS, received signals on an antenna array in regular MIMO or selected beams in MIMO may be represented by:

$$r_k, k=1\text{~}K$$

An OCC-coded DMRS of J layers on the RE may be represented by:

$$s_j, j=1\text{~}J$$

The channel estimation may be represented by:

$$h_{k,j}, k=1\text{~}K, j=1\text{~}J$$

while the estimated noise and interference on the k-th antenna may be represented by:

$$e_k = r_k - \sum_j S_{k,j} h_j$$

A noise and interference array may be:

$$E = \begin{bmatrix} e_1 \\ \vdots \\ e_k \end{bmatrix}$$

If no desired user's ports are allocated to the CDM group, then:

$$E = \begin{bmatrix} r_1 \\ \vdots \\ r_k \end{bmatrix}$$

The covariance matrix C may be represented by:

$$C = EE^H$$

Average covariances of REs over a CDM group in an RB may be represented by:

$$C_{CDM} = \frac{1}{L} \sum_l C_l$$

An average $C_{CDM}$ over CDM groups in the RB in one DMRS position may be represented by:

$$C_{Position} = \frac{1}{I} \sum_i C_{CDM}(i)$$

Additionally, an average $C_{Position}$ over all DMRS positions in a slot may be represented by:

$$C_{RB} = \frac{1}{M} \sum_m C_{Position}(m)$$

Figure 10:
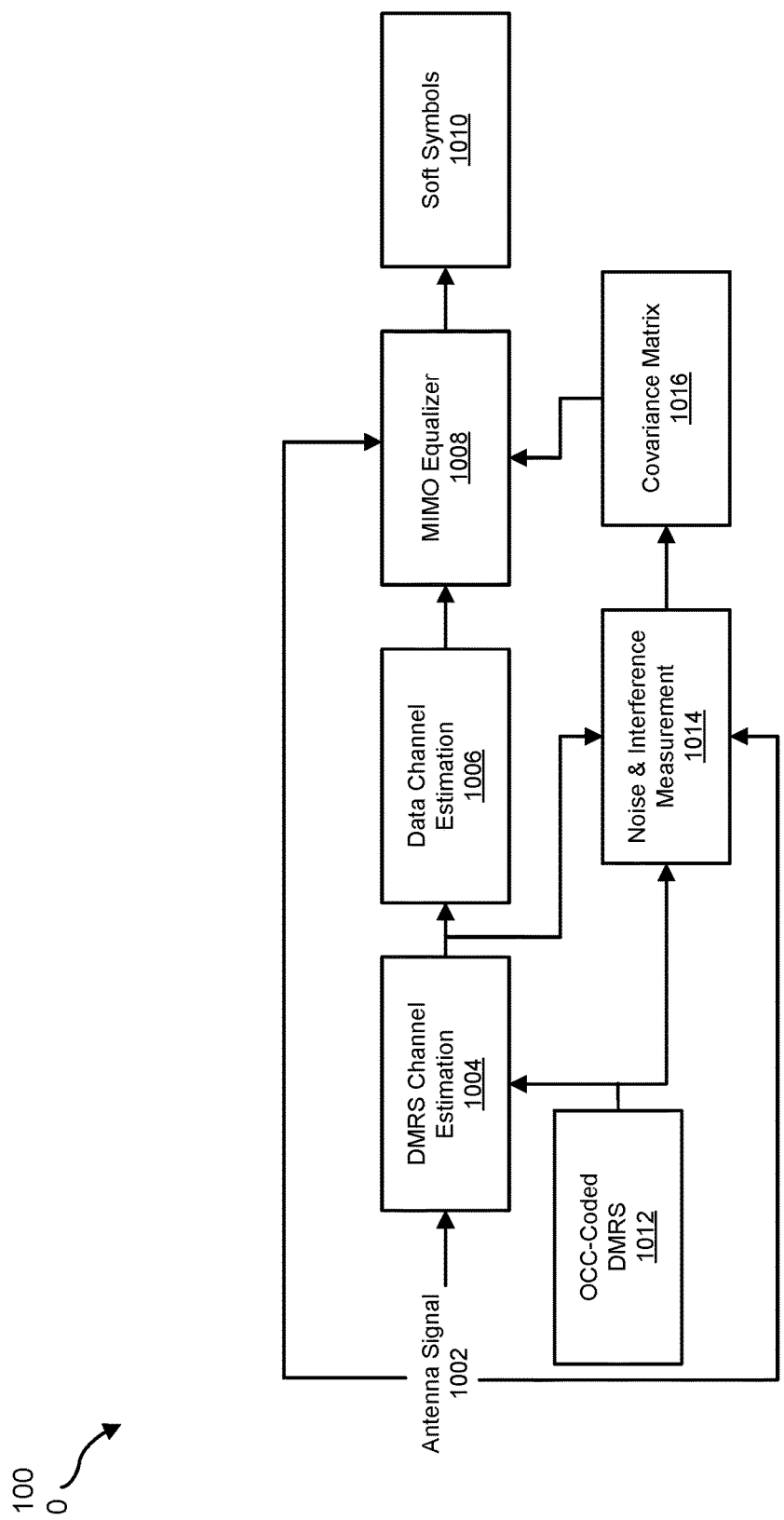
FIG. 10 includes a flow diagram that illustrates performing a MIMO equalization using a received uplink signal, a data channel estimation signal, and a covariance matrix in accordance with some embodiments described herein.

FIG. 10 may describe, illustrate, and/or disclose systems and methods for using a noise and interference covariance matrix in a receiver chain for adjacent cell interference rejection. As shown, an embodiment may receive an antenna array or beam signal (e.g., antenna signal 1002). This received signal may be for regular MIMO or on beams after beamforming for a massive MIMO. An embodiment may use the received signal as input to a DMRS channel estimation operation 1004, which may then in turn be used as input to a data channel estimation operation 1006. The DMRS channel estimation signal may be used with OCC-coded DMRS (e.g., OCC-coded DMRS 1012) to estimate the received DMRS signal. This estimated DMRS signal may be subtracted from the received signal to produce the measurement of noise and adjacent cell interference (e.g., noise & interference measurement 1014). The estimated noise and adjacent cell interference may be used to calculate the covariance of the noise and interference (e.g., covariance matrix 1016), which carries the spatial features of the adjacent cell interference.

The DMRS channel estimation may be used to populate data symbols to determine a data channel estimation on data symbols and REs (e.g., data channel estimation operation 1006). The data channel estimation, the covariance matrix, and the received signal on data symbols and REs are used together as part of a MIMO equalization operation in MIMO Equalizer 1008, sometimes referred to as a minimum mean-square error (MMSE) MIMO equalization operation. The output or result of the MMSE equalizer operation may be soft symbols 1010, which may be further used for channel decoding for each user.

As described throughout the instant disclosure, the systems and methods described herein may include or present many benefits over traditional or conventional options for DMRS allocation for uplink data transmission. As described above, the 5G-NR specification may not specify how to allocate the DMRS structures for uplink data transmission, leading to allocations that may not efficiently and effectively reject interference from adjacent cells. In contrast, the systems and methods described herein provide a collaborative DMRS allocation approach, as well as receiver algorithms that may achieve improved adjacent cell interference rejection for each cell.

The following example embodiments are also included in this disclosure:

Example 1: A computer-implemented method comprising (1) receiving, at a cell in a fifth generation new radio (5G-NR) network, a plurality of uplink signals, each uplink signal corresponding to a different user equipment (UE) device in a group of UE devices, (2) collecting, from a plurality of adjacent cells in the 5G-NR network that are adjacent to the cell, a plurality of demodulation reference signal (DMRS) configurations allocated to the plurality of adjacent cells, (3) determining, by analyzing the plurality of DMRS configurations allocated to the plurality of adjacent cells in accordance with an allocation rule for creating DMRS configurations of adjacent cells for a common frequency sub-band without overlapping coded resources, a set of available DMRS configuration candidates, and (4) selecting, based on a predetermined prioritization of DMRS parameters for a DMRS configuration, a DMRS configuration candidate from the set of available DMRS configuration candidates for the group of UE devices.

Example 2: The computer-implemented method of example 1, wherein the predetermined prioritization of DMRS parameters for the DMRS configuration comprises (1) a physical uplink shared channel mapping type, (2) a DMRS additional position value, (3) a DMRS configuration type, and (4) a DMRS length.

Example 3: The computer-implemented method of example 2, further comprising receiving, via an antenna array, an uplink signal from a UE device included in the group of UE devices, the uplink signal comprising a DMRS configured in accordance with the selected DMRS configuration candidate.

Example 4: The computer-implemented method of example 3, further comprising generating a DMRS channel estimation signal by executing a DMRS channel estimation operation using the DMRS and the selected DMRS configuration candidate.

Example 5: The computer-implemented method of example 4, further comprising measuring a noise and interference of adjacent cells based on the received signal, the DMRS channel estimation signal, and the selected DMRS configuration candidate.

Example 6: The computer-implemented method of example 5, wherein measuring the noise and interference of the adjacent cells comprises subtracting the DMRS channel estimation signal from the received signal.

Example 7: The computer-implemented method of example 5, further comprising generating a covariance matrix of the measured noise and interference of adjacent cells.

Example 8: The computer-implemented method of example 7, further comprising generating a data channel estimation signal by executing a data channel estimation operation using the DMRS channel estimation signal.

Example 9: The computer-implemented method of example 8, further comprising performing a MIMO equalization using the received uplink signal, the data channel estimation signal, and the covariance matrix.

Example 10: The computer-implemented method of example 9, wherein the MIMO equalization generates soft symbols for channel decoding.

Example 11: A system comprising (1) a receiving module, stored in memory, that receives, at a cell in a fifth generation new radio (5G-NR) network, a plurality of uplink signals, each uplink signal corresponding to a different user equipment (UE) device in a group of UE devices, (2) a collecting module, stored in memory, that collects, from a plurality of adjacent cells in the 5G-NR network that are adjacent to the cell, a plurality of demodulation reference signal (DMRS) configurations allocated to the plurality of adjacent cells, (3) a determining module, stored in memory, that determines, by analyzing the plurality of DMRS configurations allocated to the plurality of adjacent cells in accordance with an allocation rule for creating DMRS configurations of adjacent cells for a common frequency sub-band without overlapping coded resources, a set of available DMRS configuration candidates, (4) a selecting module, stored in memory, that selects, based on a predetermined prioritization of DMRS parameters for a DMRS configuration, a DMRS configuration candidate from the set of available DMRS configuration candidates for the group of UE devices, and (5) at least one physical processor that executes the receiving module, the collecting module, the determining module, and the selecting module.

Example 12: The system of example 11, wherein the predetermined prioritization of DMRS parameters for the DMRS configuration comprises (1) a physical uplink shared channel mapping type, (2) a DMRS additional position value, (3) a DMRS configuration type, and (4) a DMRS length.

Example 13: The system of example 12, wherein the receiving module further receives, via an antenna array, an uplink signal from a UE device included in the group of UE devices, the uplink signal comprising a DMRS configured in accordance with the selected DMRS configuration candidate.

Example 14: The system of example 13, wherein the receiving module further generates a DMRS channel estimation signal by executing a DMRS channel estimation operation using the DMRS and the selected DMRS configuration candidate.

Example 15: The system of example 14, wherein the receiving module further measures a noise and interference of adjacent cells based on the received signal, the DMRS channel estimation signal, and the selected DMRS configuration candidate.

Example 16: The system of example 15, wherein the receiving module measures the noise and interference of the adjacent cells by subtracting the DMRS channel estimation signal from the received signal.

Example 17: The system of example 15, wherein the receiving module further generates a covariance matrix of the measured noise and interference of adjacent cells.

Example 18: The system of example 17, wherein the receiving module further (1) generates a data channel estimation signal by executing a data channel estimation operation using the DMRS channel estimation signal, and (2) performs a MIMO equalization using the received uplink signal, the data channel estimation signal, and the covariance matrix.

Example 19: A system comprising (1) a fifth-generation new radio (5G-NR) base station, included in a cell in a 5G-NR network, that receives a plurality of uplink signals, each uplink signal corresponding to a different user equipment (UE) device in a group of UE devices, (2) a DMRS allocation device comprising (A) a receiving module that receives the plurality of uplink signals, (B) a collecting module that collects, from a plurality of adjacent cells in the 5G-NR network that are adjacent to the cell, a plurality of demodulation reference signal (DMRS) configurations allocated to the plurality of adjacent cells, (C) a determining module that determines, by analyzing the plurality of DMRS configurations allocated to the plurality of adjacent cells in accordance with an allocation rule for creating DMRS configurations of adjacent cells for a common frequency sub-band without overlapping coded resources, a set of available DMRS configuration candidates, and (D) a selecting module that selects, based on a predetermined prioritization of DMRS parameters for a DMRS configuration, a DMRS configuration candidate from the set of available DMRS configuration candidates for the group of UE devices.

Example 20: The system of example 19, wherein the receiving module further (1) receives, via an antenna array, an uplink signal from a UE device included in the group of UE devices, the uplink signal comprising a DMRS configured in accordance with the selected DMRS configuration candidate, (2) generates a DMRS channel estimation signal by executing a DMRS channel estimation operation using the DMRS and the selected DMRS configuration candidate, (3) measures a noise and interference of adjacent cells based on the received signal, the DMRS channel estimation signal, and the selected DMRS configuration candidate, (4) generates a covariance matrix of the measured noise and interference of adjacent cells. (5) generates a data channel estimation signal by executing a data channel estimation operation using the DMRS channel estimation signal, and (6) performs a MIMO equalization using the received uplink signal, the data channel estimation signal, and the covariance matrix.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a frequency domain signal to be transformed, transform the frequency domain signal, output a result of the transformation to perform a channel estimation function, use the result of the transformation to estimate an uplink channel, and store the result of the transformation to maintain or reestablish a connection with a user equipment device via the uplink channel. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving, at a cell in a fifth-generation new radio (SG-NR) network, a plurality of uplink signals, each uplink signal corresponding to a different user equipment (UE) device in a group of UE devices;
   collecting, from a plurality of adjacent cells in the SG-NR network that are adjacent to the cell, a plurality of demodulation reference signal (DMRS) configurations allocated to the plurality of adjacent cells;
   determining, by analyzing the plurality of DMRS configurations allocated to the plurality of adjacent cells in accordance with an allocation rule for creating DMRS configurations of adjacent cells for a common frequency sub-band without overlapping coded resources, a set of available DMRS configuration candidates;
   selecting, based on a predetermined prioritization of DMRS parameters for a DMRS configuration, a DMRS configuration candidate from the set of available DMRS configuration candidates for the group of UE devices; and
   receiving, via an antenna array, an uplink signal from a UE device included in the group of UE devices, the uplink signal comprising a DMRS configured in accordance with the selected DMRS configuration candidate.

2. The computer-implemented method of claim 1, wherein the predetermined prioritization of DMRS parameters for the DMRS configuration comprises:
   a physical uplink shared channel mapping type; a DMRS additional position value; a DMRS configuration type; and a DMRS length.

3. The computer-implemented method of claim 1, further comprising generating a DMRS channel estimation signal by executing a DMRS channel estimation operation using the DMRS and the selected DMRS configuration candidate.

4. The computer-implemented method of claim 3, further comprising measuring a noise and interference of adjacent cells based on the received signal, the DMRS channel estimation signal, and the selected DMRS configuration candidate.

5. The computer-implemented method of claim 4, wherein measuring the noise and interference of the adjacent cells comprises subtracting the DMRS channel estimation signal from the received signal.

6. The computer-implemented method of claim 4, further comprising generating a covariance matrix of the measured noise and interference of adjacent cells.

7. The computer-implemented method of claim 6, further comprising generating a data channel estimation signal by executing a data channel estimation operation using the DMRS channel estimation signal.

8. The computer-implemented method of claim 7, further comprising performing a MIMO equalization using the received uplink signal, the data channel estimation signal, and the covariance matrix.

9. The computer-implemented method of claim 8, wherein the MIMO equalization generates soft symbols for channel decoding.

10. A system comprising:
a receiving module, stored in memory, that (i) receives, at a cell in a fifth-generation new radio (5G-NR) network, a plurality of uplink signals, each uplink signal corresponding to a different user equipment (UE) device in a group of UE devices, and (ii) receives, via an antenna array, an uplink signal from a UE device included in the group of UE devices, the uplink signal comprising a DMRS configured in accordance with a selected DMRS configuration candidate;
a collecting module, stored in memory, that collects, from a plurality of adjacent cells in the 5G-NR network that are adjacent to the cell, a plurality of demodulation reference signal (DMRS) configurations allocated to the plurality of adjacent cells;
a determining module, stored in memory, that determines, by analyzing the plurality of DMRS configurations allocated to the plurality of adjacent cells in accordance with an allocation rule for creating DMRS configurations of adjacent cells for a common frequency sub-band without overlapping coded resources, a set of available DMRS configuration candidates;
a selecting module, stored in memory, that selects, based on a predetermined prioritization of DMRS parameters for a DMRS configuration, the DMRS configuration candidate from the set of available DMRS configuration candidates for the group of UE devices; and
at least one physical processor that executes the receiving module, the collecting module, the determining module, and the selecting module.

11. The system of claim 10, wherein the predetermined prioritization of DMRS parameters for the DMRS configuration comprises:
a physical uplink shared channel mapping type; a DMRS additional position value; a DMRS configuration type; and a DMRS length.

12. The system of claim 11, wherein the receiving module further generates a DMRS channel estimation signal by executing a DMRS channel estimation operation using the DMRS and the selected DMRS configuration candidate.

13. The system of claim 12, wherein the receiving module further measures a noise and interference of adjacent cells based on the received signal, the DMRS channel estimation signal, and the selected DMRS configuration candidate.

14. The system of claim 13, wherein the receiving module measures the noise and interference of the adjacent cells by subtracting the DMRS channel estimation signal from the received signal.

15. The system of claim 13, wherein the receiving module further generates a covariance matrix of the measured noise and interference of adjacent cells.

16. The system of claim 15, wherein the receiving module further:
generates a data channel estimation signal by executing a data channel estimation operation using the DMRS channel estimation signal; and
performs a MIMO equalization using the received uplink signal, the data channel estimation signal, and the covariance matrix.

17. A system comprising:
a fifth-generation new radio (5G-NR) base station, included in a cell in a 5G-NR network, that receives a plurality of uplink signals, each uplink signal corresponding to a different user equipment (UE) device in a group of UE devices;
a DMRS allocation device comprising:
a receiving module that (i) receives the plurality of uplink signals, and (ii) receives, via an antenna array, an uplink signal from a UE device included in the group of UE devices, the uplink signal comprising a DMRS configured in accordance with a selected DMRS configuration candidate;
a collecting module that collects, from a plurality of adjacent cells in the 5G-NR network that are adjacent to the cell, a plurality of demodulation reference signal (DMRS) configurations allocated to the plurality of adjacent cells;
a determining module that determines, by analyzing the plurality of DMRS configurations allocated to the plurality of adjacent cells in accordance with an allocation rule for creating DMRS configurations of adjacent cells for a common frequency sub-band without overlapping coded resources, a set of available DMRS configuration candidates; and
a selecting module that selects, based on a predetermined prioritization of DMRS parameters for a DMRS configuration, the DMRS configuration candidate from the set of available DMRS configuration candidates for the group of UE devices.

18. The system of claim 17, wherein the receiving module further:
generates a DMRS channel estimation signal by executing a DMRS channel estimation operation using the DMRS and the selected DMRS configuration candidate;
measures a noise and interference of adjacent cells based on the received signal, the DMRS channel estimation signal, and the selected DMRS configuration candidate;
generates a covariance matrix of the measured noise and interference of adjacent cells;
generates a data channel estimation signal by executing a data channel estimation operation using the DMRS channel estimation signal; and
performs a MIMO equalization using the received uplink signal, the data channel estimation signal, and the covariance matrix.

* * * * *